US011578457B2

(12) United States Patent
Schultz et al.

(10) Patent No.: US 11,578,457 B2
(45) Date of Patent: Feb. 14, 2023

(54) FABRIC WITH ENHANCED RESPONSE CHARACTERISTICS FOR LASER FINISHING

(71) Applicant: Levi Strauss & Co., San Francisco, CA (US)

(72) Inventors: Jennifer Schultz, San Francisco, CA (US); Susanne St. Onge-Simpson, San Francisco, CA (US); James Barton Sights, San Francisco, CA (US); Berke Aydemir, Istanbul (TR)

(73) Assignee: Levi Strauss & Co., San Francisco, CA (US)

( * ) Notice: Subject to any disclaimer, the term of this patent is extended or adjusted under 35 U.S.C. 154(b) by 0 days.

(21) Appl. No.: 15/841,263

(22) Filed: Dec. 13, 2017

(65) Prior Publication Data

US 2018/0160756 A1 Jun. 14, 2018

Related U.S. Application Data

(60) Provisional application No. 62/433,739, filed on Dec. 13, 2016.

(51) Int. Cl.
| | |
|---|---|
| *D06P 5/15* | (2006.01) |
| *A41H 3/08* | (2006.01) |
| *A41H 3/00* | (2006.01) |
| *D06C 23/02* | (2006.01) |
| *D03D 1/00* | (2006.01) |
| *D06P 3/60* | (2006.01) |
| *D06P 1/22* | (2006.01) |
| *D04H 1/02* | (2006.01) |
| *D03D 13/00* | (2006.01) |
| *D06B 11/00* | (2006.01) |
| *D06P 5/20* | (2006.01) |
| *D03D 15/54* | (2021.01) |
| *A41D 27/08* | (2006.01) |
| *A41D 31/00* | (2019.01) |
| *B23K 26/00* | (2014.01) |

(52) U.S. Cl.
CPC .............. *D06P 5/15* (2013.01); *A41D 27/08* (2013.01); *A41D 31/00* (2013.01); *A41H 3/007* (2013.01); *A41H 3/08* (2013.01); *B23K 26/0006* (2013.01); *D03D 1/00* (2013.01); *D03D 13/004* (2013.01); *D03D 15/54* (2021.01); *D04H 1/02* (2013.01); *D06B 11/0096* (2013.01); *D06C 23/02* (2013.01); *D06P 1/228* (2013.01); *D06P 3/6025* (2013.01); *D06P 5/2011* (2013.01); *D05D 2305/08* (2013.01); *D05D 2305/24* (2013.01); *D10B 2201/02* (2013.01); *D10B 2501/04* (2013.01)

(58) Field of Classification Search
CPC ........ A41H 3/08; A41H 3/007; D06F 35/006; D06C 23/02; D03D 1/00; D03D 2700/014; D06P 3/6025; D06P 1/228; D04H 1/02; A41D 27/08; A41D 21/00; B23K 26/0006; D05D 2305/24; D05D 2305/08
See application file for complete search history.

(56) References Cited

U.S. PATENT DOCUMENTS

| | | | | |
|---|---|---|---|---|
| 5,330,538 | A * | 7/1994 | Teague | D06Q 1/00 8/114.6 |
| 5,514,187 | A * | 5/1996 | McFarland | D06P 1/0004 8/108.1 |
| 2005/0011013 | A1 * | 1/2005 | Schrott | D06P 5/153 8/115.51 |
| 2007/0214581 | A1 * | 9/2007 | Scheibli | D06P 1/623 8/465 |
| 2014/0150187 | A1 | 6/2014 | Schoots | |
| 2014/0277663 | A1 * | 9/2014 | Gupta | G06Q 50/04 700/98 |
| 2015/0034205 | A1 * | 2/2015 | Yenici | D03D 1/00 139/421 |
| 2015/0275423 | A1 | 10/2015 | Finley | |
| 2016/0251782 | A1 * | 9/2016 | Liao | D04B 1/12 66/202 |
| 2016/0263928 | A1 * | 9/2016 | Costin, Jr. | D06B 11/0096 |

FOREIGN PATENT DOCUMENTS

| | | |
|---|---|---|
| WO | WO/2001/025824 | 4/2001 |
| WO | WO2015/042441 | 3/2015 |

OTHER PUBLICATIONS

Tytti Alapieti, "Creating an Efficient and Scalable Manufacturing System for Customized Made-To-Measure Jeans", Master of Science thesis, 102 pgs., Tampere University of Technology, Finland, 2012, published online at: httos://trepo.tuni.fl// handle/123456789/21068.*

International Search Report, PCT Application PCT/US2017/066223, dated Mar. 27, 2018, 3 pages.

Pushpa Bajaj; Rohit Agarwal, Innovations in Denim Production, American Dyestuff Reporter, May 1999 (May 1999), vol. 88, No. 5, pp. 26-36, Department of Textile Technology, Indian, Institute of Technology, New Delhi, India.

(Continued)

*Primary Examiner* — Amina S Khan
(74) *Attorney, Agent, or Firm* — Aka Chan LLP

(57) ABSTRACT

A fabric has enhanced response characteristics for laser finishing. The fabric can be denim for denim apparel such as jeans. Software and lasers are used to finish apparel made of the fabric to produce a desired wear or distressing pattern or other design. The fabric allows for relatively fast color change in response to the laser, color changes in hue from indigo blue to white, many grayscale levels, and maintains strength and stretch properties. A method used to make the fabric includes spinning, dyeing, and weaving yarns in such a way to obtain the desired enhanced response characteristics for laser finishing.

27 Claims, 11 Drawing Sheets

(56) References Cited

OTHER PUBLICATIONS

European Patent Office, Extended European Search Report, EP Application No. 17879665.2, dated Sep. 9, 2020, 2 pages.
Chi-wai Kan, "CO2 laser treatment as a clean process for treating denim fabric", pp. 624-631, 2014, Journal of Cleaner Production.†
Mohammad Gias Uddin, "Indigo Ring Dyeing of Cotton Warp Yarns for Denim Fabric", pp. 149-154, 2014, Chemical and Materials Engineering.†
J N Chakraborty, "Dyeing of denim with indigo", pp. 100-109, Mar. 2004, Indian Journal of Fibre & Textile Research.†
O. N. Hung, et al., "Artificial Neural Network Approach for Predicting Colour Properties of Laser-treated Denim Fabrics", pp. 1330-1336, 2014, Fibers and Polymers.†
Clariant Advanced Denim, "Denim Book From cotton to fashion", 106 pgs., 2012, Clariant International Ltd.†
Video: "Light Sensitive Fabric", uploaded on Oct. 20, 2016 by user Jeanologia, 24 pgs., UR: https://www.youtube.com/watch?v=3s7OvwcRR50 (screen shots).†
Technical Document: "Jeanologia The Science of Finishing Design Manual English Version", 73 pgs., 2009, published by the Spanish company Jeanologia.†
Video by Jeanologia published on www.youtube.com on Apr. 7, 2016 by user Jeanologia, 19 pgs., URL: https://www.youtube.com/watch?v=2y26Oqu5fiA&feature=youtu.be (screen shots).†

\* cited by examiner
† cited by third party

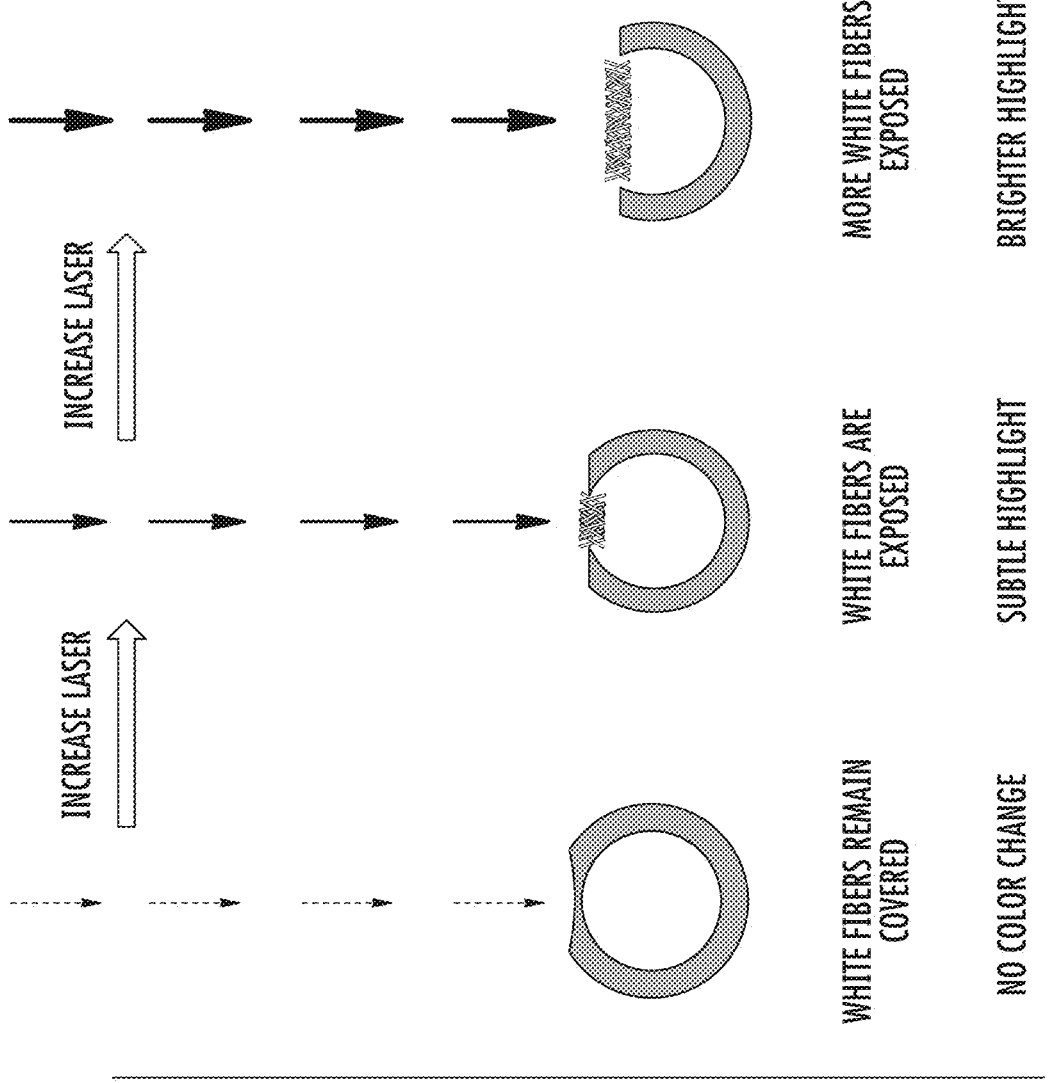

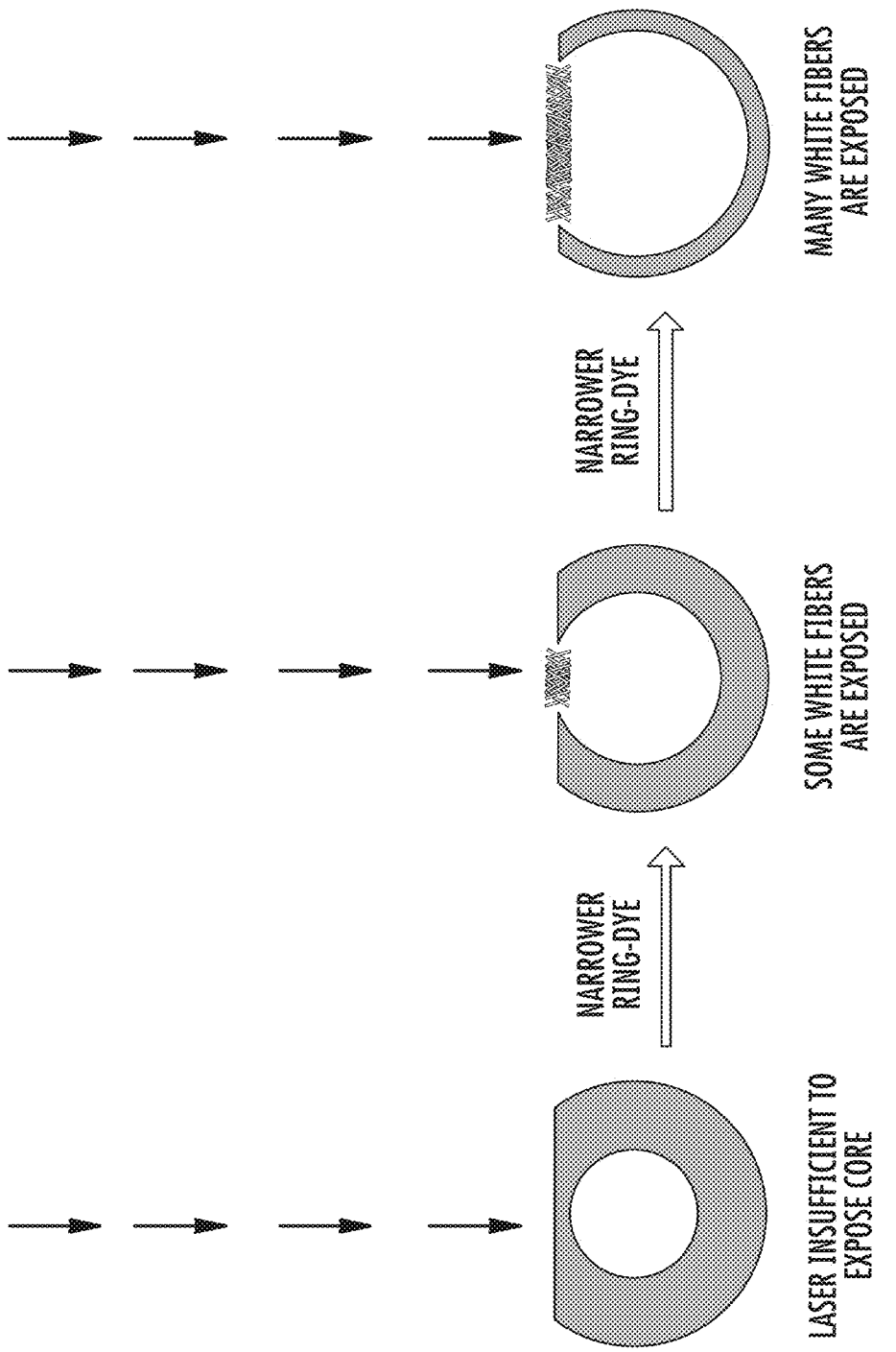

FABRIC WITH ENHANCED RESPONSE CHARACTERISTICS FOR LASER FINISHING

CROSS-REFERENCE TO RELATED APPLICATIONS

This patent application claims the benefit of U.S. patent application 62/433,739, filed Dec. 13, 2016, which is incorporated by reference along with all other references cited in this application.

BACKGROUND OF THE INVENTION

The present invention relates to textiles and, more specifically, to materials and fabrics and their manufacture, in which the materials and fabrics will have enhanced response characteristics for laser finishing, especially for denim and denim apparel including jeans, shirts, shorts, jackets, vests, and skirts, to obtain a faded, distressed, washed, or worn finish or appearance.

In 1853, during the California Gold Rush, Levi Strauss, a 24-year-old German immigrant, left New York for San Francisco with a small supply of dry goods with the intention of opening a branch of his brother's New York dry goods business. Shortly after arriving in San Francisco, Mr. Strauss realized that the miners and prospectors (called the "forty niners") needed pants strong enough to last through the hard work conditions they endured. So, Mr. Strauss developed the now familiar jeans which he sold to the miners. The company he founded, Levi Strauss & Co., still sells jeans and is the most widely known jeans brand in the world. Levi's is a trademark of Levi Strauss & Co.

Though jeans at the time of the Gold Rush were used as work clothes, jeans have evolved to be fashionably worn everyday by men and women, showing up on billboards, television commercials, and fashion runways. Fashion is one of the largest consumer industries in the U.S. and around the world. Jeans and related apparel are a significant segment of the industry.

As fashion, people are concerned with the appearance of their jeans. Many people desire a faded or worn blue jeans look. In the past, jeans became faded or distressed through normal wash and wear. The apparel industry recognized people's desire for the worn blue jeans look and began producing jeans and apparel with different wear patterns. The wear patterns have become part of the jeans style and fashion. Some examples of wear patterns include combs or honeycombs, whiskers, stacks, and train tracks.

Despite the widespread success jeans have enjoyed, the process to produce modern jeans with wear patterns takes processing time, has relatively high processing cost, and is resource intensive. A typical process to produce jeans uses significant amounts of water, chemicals (e.g., bleaching or oxidizing agents), ozone, enzymes, and pumice stone. For example, it may take from about 20 to 60 liters of water to finish each pair of jeans.

Therefore, there is a need for an improved materials and fabrics for laser finishing of jeans and other apparel that reduces environmental impact, processing time, and processing costs, while maintaining the look and style of traditional finishing techniques.

BRIEF SUMMARY OF THE INVENTION

A fabric has enhanced response characteristics for laser finishing. The fabric can be denim for denim apparel such as jeans. Software and lasers are used to finish apparel made of the fabric to produce a desired wear or distressing pattern or other design. The fabric allows for relatively fast color change in response to the laser, color changes in hue from indigo blue to white, many grayscale levels, and maintains strength and stretch properties. A method used to make the fabric includes spinning, dyeing, and weaving yarns in such a way to obtain the desired enhanced response characteristics for laser finishing.

In an implementation, a method includes: processing a cotton yarn using an indigo dye to have a cross section having an outer ring and an inner core, where a thickness of the outer ring is about, for example, 10 percent (e.g., from about 7.5 percent to about 12.5 percent) of a total thickness of the yarn, and the outer ring is indigo colored due to being penetrated through by the indigo dye while the inner core is white or off-white colored due to not being penetrated to by the indigo dye; and weaving the dyed cotton yarn into a denim fabric, where the warp yarns include dyed cotton and the weft yarns include undyed cotton, and the denim fabric is to be finished by exposing the dyed cotton yarn to a laser.

When exposed to the laser, the laser creates a finishing pattern on a surface of the garment based on a laser input file provided to the laser. The laser input file includes a laser exposure values for different laser pixel location. For each laser exposure value, the laser removes a depth or thickness of material from the surface of the denim material that corresponds to the laser exposure value.

For lighter pixel locations of the finishing pattern, a greater depth of the indigo ring-dyed cotton yarn is removed, revealing a greater width of an inner core of the dyed yarn, as compared to darker pixel locations of the finishing pattern, where a lesser depth of the indigo ring-dyed cotton yarn is removed, revealing a lesser width of an inner core of the dyed yarn.

In another implementation, a method includes: A garment made from fabric panels of a denim material is provided. The fabric panels are sewn together using thread. The denim material will be finished by using a laser to remove selected amounts of material from a surface of the denim material at selected locations of the garment.

The denim material includes an indigo ring-dyed cotton yarn having cross section having an outer ring and an inner core. A cross-sectional profile of the outer ring relative to the inner core is compatible with the laser to obtain at least 64 different grayscale levels. For the cross-sectional profile, a thickness of the outer ring that is, for example, about 10 percent (e.g., from about 7.5 percent to about 12.5 percent) of a total thickness of the yarn.

The outer ring is indigo colored due to being penetrated through by an indigo dye while the inner core is white or off-white colored due to not being penetrated to by the indigo dye. The indigo ring-dyed cotton yarn with laser-compatible cross-sectional profile is obtained by a dyeing process.

The process can include: mercerizing an undyed yarn in an alkaline solution to obtain an mercerized undyed yarn; immersing the mercerized undyed yarn into at least one indigo dye solution having a pH in a range, for example, from about 10.7 to about 11.6; and exposing the garment to a laser to create a finishing pattern on a surface of the garment based on a laser input file provided to the laser. The laser input file has laser exposure values, each for a different laser pixel location.

For each laser exposure value, the laser will remove a depth of material from the surface of the garment that corresponds to the laser exposure value. Tor lighter pixel locations of the finishing pattern, a greater depth of the indigo ring-dyed cotton yarn is removed as compared to darker pixel locations of the finishing pattern, where a lesser depth of the indigo ring-dyed cotton yarn is removed.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 10-13 show how the laser alters the color of ring-dyed yarn.

FIGS. 14-16 show the impact of the thickness or depth of the ring dye on the laser's ability alter the color of the ring-dyed yarn.

DETAILED DESCRIPTION OF THE INVENTION

Figure 1:
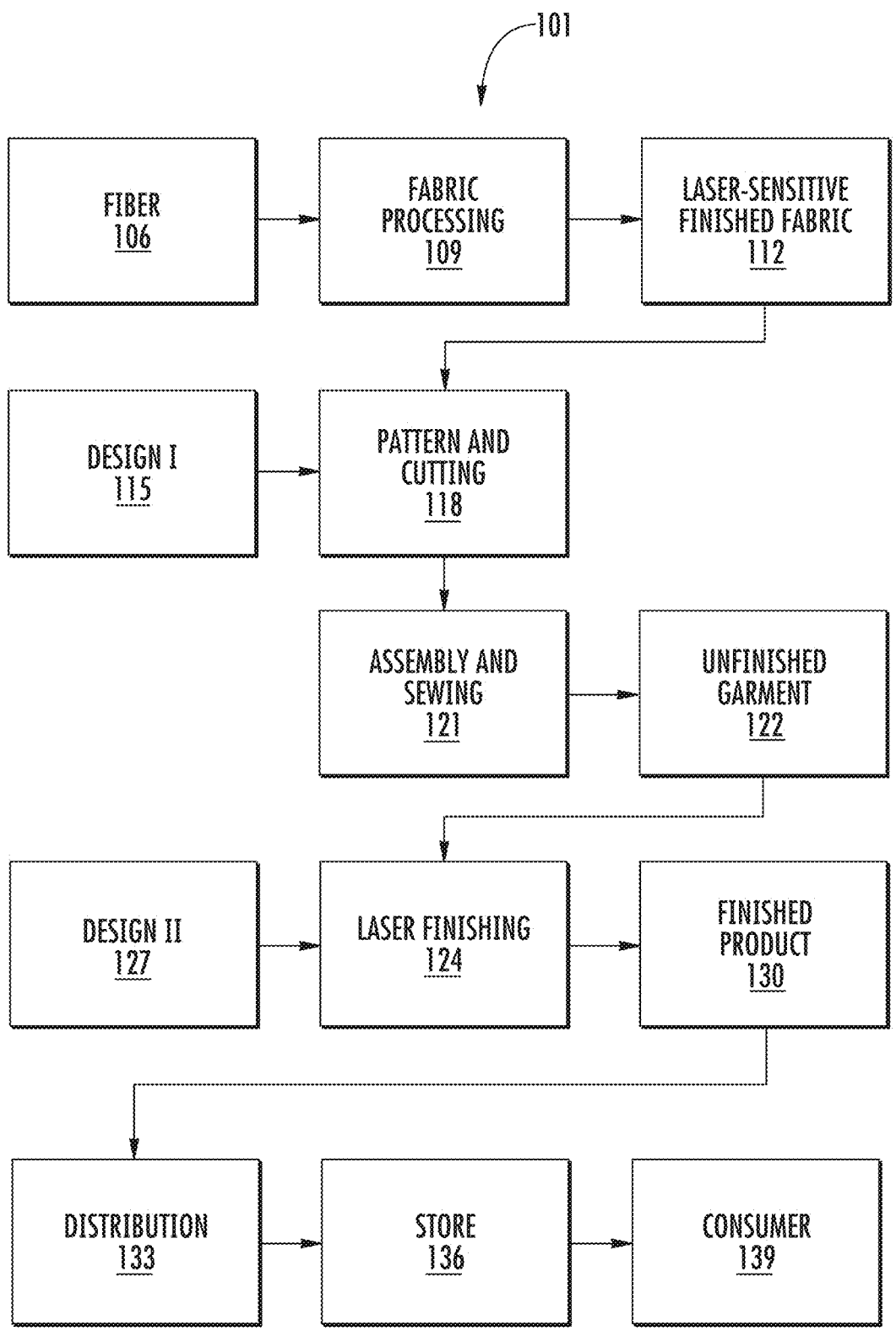
FIG. 1 shows a process flow for manufacturing apparel such as jeans where garments are finished using a laser.

FIG. 1 shows a process flow 101 for manufacturing apparel such as jeans, where garments are finished using a laser. The fabric or material for various apparel including jeans is made from natural or synthetic fibers 106, or a combination of these. A fabric mill takes fibers and processes 109 these fibers to produce a laser-sensitive finished fabric 112, which has enhanced response characteristics for laser finishing.

Some examples of natural fibers include cotton, flax, hemp, sisal, jute, kenaf, and coconut; fibers from animal sources include silk, wool, cashmere, and mohair. Some examples of synthetic fibers include polyester, nylon, spandex or elastane, and other polymers. Some examples of semisynthetic fibers include rayon, viscose, modal, and lyocell, which are made from a regenerated cellulose fiber. A fabric can be a natural fiber alone (e.g., cotton), a synthetic fiber alone (e.g., polyester alone), a blend of natural and synthetic fibers (e.g., cotton and polyester blend, or cotton and spandax), or a blend of natural and semisynthetic fibers, or any combination of these or other fibers.

For jeans, the fabric is typically a denim, which is a sturdy cotton warp-faced textile in which a weft passes under two or more warp threads. This twill weaving produces a diagonal ribbing. The yarns (e.g., warp yarns) are dyed using an indigo or blue dye, which is characteristic of blue jeans.

Although this patent describes the apparel processing and finishing with respect to jeans, the invention is not limited jeans or denim products, such as shirts, shorts, jackets, vests, and skirts. The techniques and approaches described are applicable to other apparel and products, including nondenim products and products made from knit materials. Some examples include T-shirts, sweaters, coats, sweatshirts (e.g., hoodies), casual wear, athletic wear, outerwear, dresses, evening wear, sleepwear, loungewear, underwear, socks, bags, backpacks, uniforms, umbrellas, swimwear, bed sheets, scarves, and many others.

A manufacturer creates a design 115 (design I) of its product. The design can be for a particular type of clothing or garment (e.g., men's or women's jean, or jacket), sizing of the garment (e.g., small, medium, or large, or waist size and inseam length), or other design feature. The design can be specified by a pattern or cut used to form pieces of the pattern. A fabric is selected and patterned and cut 118 based on the design. The pattern pieces are assembled together 121 into the garment, typically by sewing, but can be joined together using other techniques (e.g., rivets, buttons, zipper, hoop and loop, adhesives, or other techniques and structures to join fabrics and materials together).

Some garments can be complete after assembly and ready for sale. However, other garments are unfinished 122 and have additional laser finishing 124. The finishing may include tinting, washing, softening, and fixing. For distressed denim products, the finishing can include using a laser to produce a wear pattern according to a design 127 (design II). Some additional details of laser finishing are described in U.S. patent application 62/377,447, filed Aug. 19, 2016, which is incorporated by reference. U.S. patent application Ser. Nos. 15/841,267, 15/841,268, 15/841,271, and 15/841,272, filed Dec. 13, 2017; Ser. No. 15/682,507, filed Aug. 21, 2017; and 62/433,746, filed Dec. 13, 2016, are also incorporated by reference.

Design 127 is for postassembly aspects of a garment while design 115 is for preassembly aspects of a garment. After finishing, a finished product 130 is complete and ready for sale. The finished product is inventoried and distributed 133, delivered to stores 136, and sold to consumers or customers 139. The consumer can buy and wear worn blue jeans without having to wear out the jeans themselves, which usually takes significant time and effort.

Traditionally, to produce distressed denim products, finishing techniques include dry abrasion, wet processing, oxidation, or other techniques, or combinations of these, to accelerate wear of the material in order to produce a desired wear pattern. Dry abrasion can include sandblasting or using sandpaper. For example, some portions or localized areas of the fabric are sanded to abrade the fabric surface. Wet processing can include washing in water, washing with oxidizers (e.g., bleach, peroxide, ozone, or potassium permanganate), spraying with oxidizers, washing with abrasives (e.g., pumice, stone, or grit).

These traditional finishing approaches take time, incur expense, and impact the environment by utilizing resources and producing waste. It is desirable to reduce water and chemical usage, which can include eliminating the use agents such as potassium permanganate and pumice. An alternative to these traditional finishing approaches is laser finishing.

Figure 2:
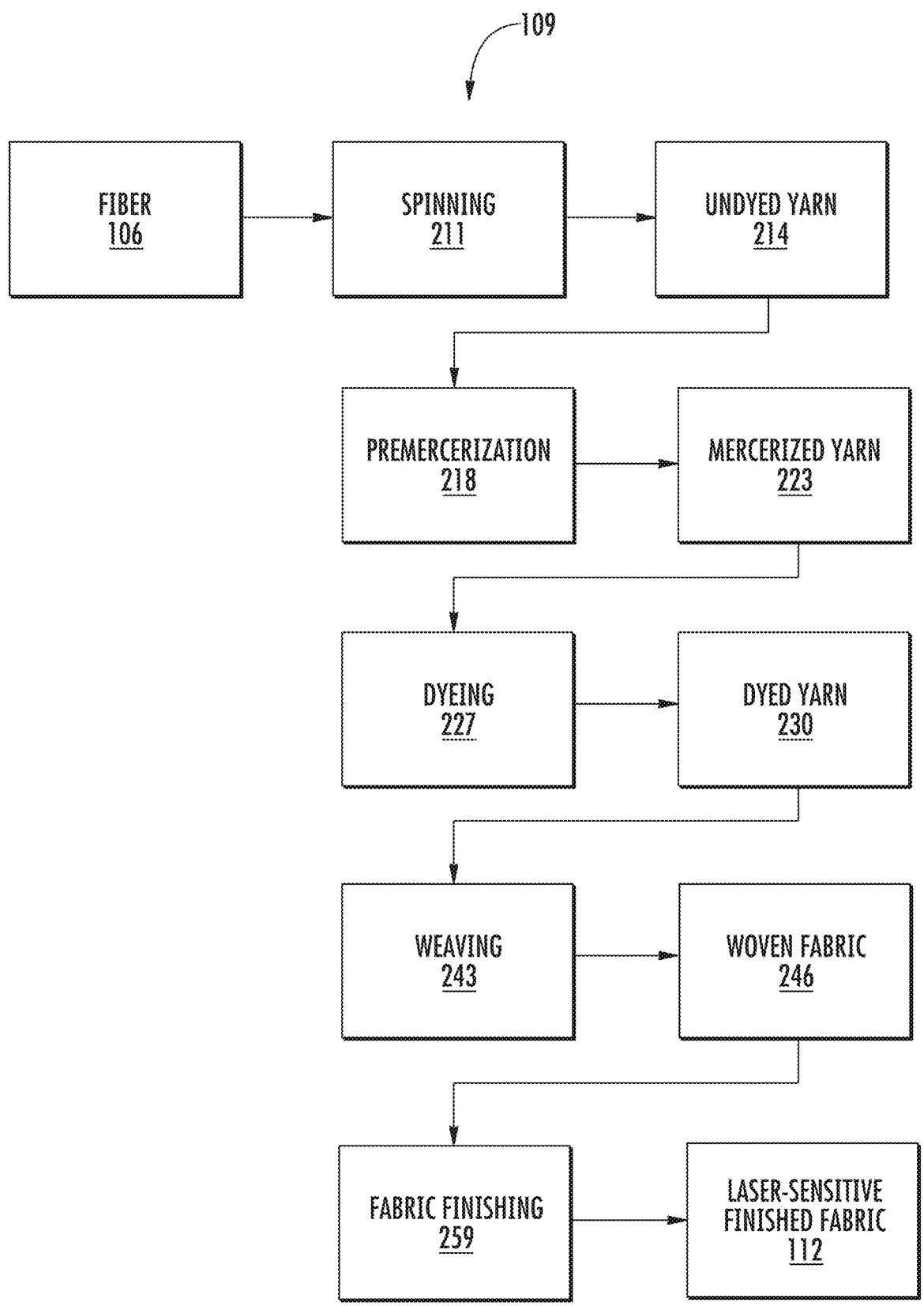
FIG. 2 shows a flow for fabric processing to produce a laser-sensitive finished fabric.

FIG. 2 shows a flow for fabric processing 109 to produce a laser-sensitive finished fabric. In a specific implementation, the fabric is laser-sensitive denim that is made for laser finishing, where the laser produces a distressed finish.

Denim fabric is typically made from cotton, which is a plant-based cellulose fiber. There are many different varieties of cotton including upland cotton and long staple cotton, also know as Pima cotton. Upland cotton has fiber lengths from about 13 to 35 millimeters, while long staple cotton have fiber lengths from about 25 to 65 millimeters. The fiber length for denim is generally about 28 millimeters or greater. Denim is often made from upland cotton, but may be from other varieties or a blend of different varieties of cotton.

A cotton picker machine picks the cotton bolls from the cotton plant. The cotton bolls are the fruit of the cotton plant and include lint and cotton seeds. The cotton fibers twist and spiral together. A cotton gin separates the lint from the cotton seeds and other debris, which are discarded and used for other purposes (e.g., extracting cottonseed oil). Cotton is generally a white or off-white color. The cotton fiber is hollow, allowing the fiber to absorb moisture—making cotton warm in the winter and cool in the summer.

Fiber 106 can be 100 percent cotton fiber. Or fiber 106 can be a blend, including cotton and other noncotton fibers to modify the characteristics of the fabric. For example, spandex, elastane, or other elastic polyurethane fiber can be blended with the cotton fibers to give the denim a stretch characteristic.

By spinning 211 the fiber, an undyed yarn 214 is obtained. During spinning, cotton staple fibers or a blend of cotton and other fibers are twisted together to form a continuous spun yarn. Depending on the specific spinning process, a diameter and number of twists in the yarn can vary. The undyed yarn is the same color as the cotton fiber, white or off white.

Spinning can be by, for example, ring spinning, rotor spinning, or other spinning technique. Another spinning technique is core spinning, where a fiber (e.g., staple fiber) is wound around a core of another material, such as polyester or elastane. Core spinning can be used to be used create stretch denim material.

After spinning and before dyeing, the yarn can be mercerized 218 to obtain a mercerized yarn 223. Mercerization can also be performed after weaving. When performed on the undyed yarn, the mercerization can be referred to as premercerization. When performed on the fabric, the mercerization can be referred to as fabric mercerization. Mercerization is optional and yarns and fabrics are not necessarily mercerized. If used, mercerization is usually done only once in the process, either yarn premercerization or fabric mercerization.

Mercerization strengthens the yarn and gives the yarn a more lustrous appearance. Mercerization alters the chemical structure of the cotton fiber. Mercerizing results in the swelling of the cell wall of the cotton fiber. This causes an increase in the surface area and reflectance, and gives the fiber a softer feel. In an implementation, for premercerization, the yarn is treated in a sodium hydroxide bath (or other chemical, typically highly alkaline solution, that causes the fibers to swell). This is followed with an acid bath that neutralizes the sodium hydroxide.

After spinning and optionally mercerization, a dyeing process 227 in which the yarn is dyed. For blue denim, the undyed yarn is dyed using an indigo dye to obtain a dyed yarn 230, which will be indigo blue. The dyed yarn is woven 243 to obtain a woven fabric 246, which can be further finished by fabric finishing 259. Fabric finishing may include, for example, preshrinking. This results in laser-sensitive finished fabric 112.

Figure 3:
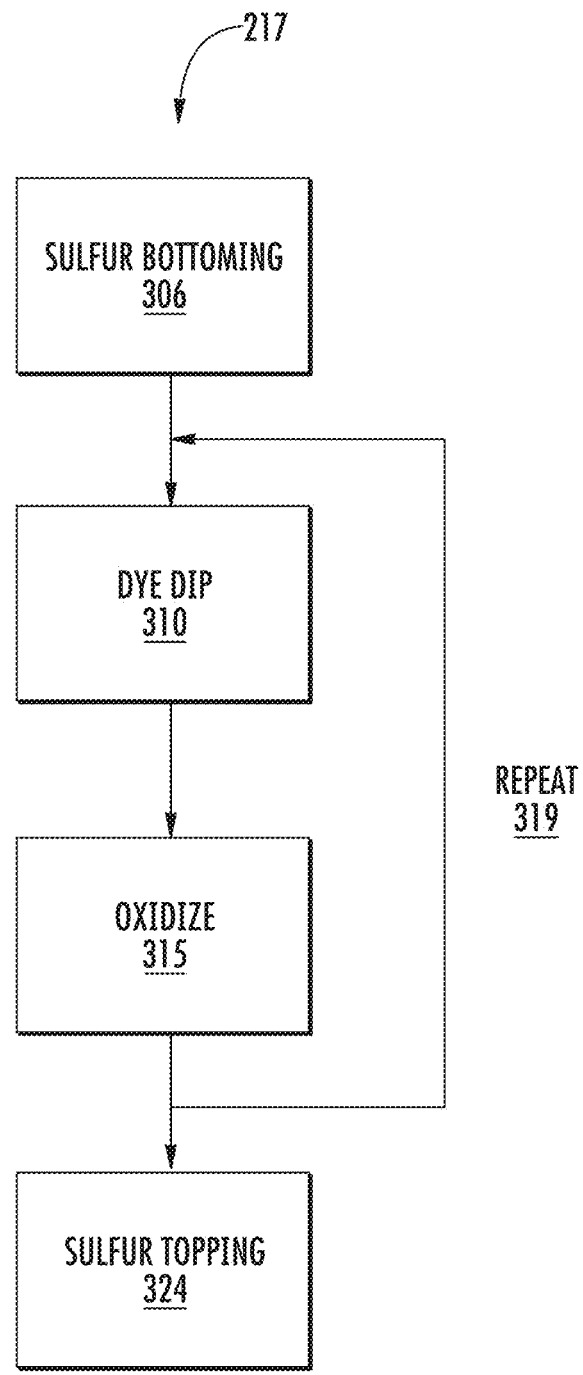
FIG. 3 shows a flow for a dyeing process.

FIG. 3 shows a flow for dyeing process 217 that includes dyeing using indigo. Indigo dye is blue dye with a chemical formula $C_{16}H_{10}N_2O_2$. Indigo dye can be plant-based or synthetic. Indigo dye has very low solubility in water and is considered insoluble. To be dissolved, the indigo dye is converted into a soluble form by a reduction process. A chemical reduction process is to use, for example, sodium hydrosulphite or other chemical constituent, which reduces indigo rapidly in solution at temperatures from about 30 to 60 degrees Celsius. Other reduction processes include bacterial reduction and electrochemical reduction.

For dyeing, a pH of the reduced indigo solution can be a range from about 10.5 to about 13, which is a basic solution. In chemistry, pH is a numeric scale that specifies an acidity or basicity (or alkalinity) of an aqueous solution in which 7 is considered neutral. Water has a pH of 7. A pH value is defined as the decimal logarithm of the reciprocal of the hydrogen ion activity in a solution. Solutions having pH greater than 7 would be consider basic, while solutions with pH less than 7 would be consider acidic. A usual range for pH is from 0 to 14, but the pH value can be below 0 or above 14. The pH is a relative value: The higher the pH indicates the greater the basicity or less the acidity of a solution. The lower the pH indicates the less the basicity or greater the acidity of a solution.

An indigo dying process can include, optionally, a sulfur bottoming 306 before dyeing with indigo. For sulfur bottoming, the yarn is first dyed using a sulfur dye or sulfur dyestuff. Often the sulfur dye is black or gray, but can be other colors. Generally sulfur bottoming is used to give yarn a particular color cast. Sulfur bottoming is optional and can be omitted from the dyeing process.

Indigo dyeing occurs by dipping 310 or immersing yarn into a vat with the reduced indigo dye. The color of the reduced indigo dye solution is not indigo or blue, but rather greenish or yellowish-green in color. When a white yarn is dipped into and removed from a vat with reduced indigo dye, the yarn will be yellowish-green in color. However, by exposure to oxygen in the air, the indigo oxidizes 315, and slowly over time, the yellowish-green yarn will turn the familiar blue color associated indigo. The blue color is caused by chromophores trapped in the fabric which reflect light as a blue color. The blue color of indigo has a wavelength between about 420 to 465 nanometers.

The dye dipping and oxidizing steps can be repeated multiple times 319, such as 2, 3, 4, 5, 6, 7, 8, 12, or more times. Multiple dips can be used to obtain deeper shades of blue. With each dip, the dye penetrates (e.g., migrates or diffuses) more toward a center or core of the yarn, rather than staying on the surface or close to the surface of the yarn.

After indigo dying is completed, the process can include, optionally, a sulfur topping topping 324. Sulfur topping is similar to sulfur bottoming, but sulfur topping occurs after indigo dyeing instead of before. Sulfur topping is optional and can be omitted from the dyeing process.

In an implementation, the dying process includes sulfur bottoming, indigo dyeing, and sulfur topping. In an implementation, the sulfur bottoming and sulfur topping are not used, and the yarn will be dyed using only indigo. Another implementation includes sulfur bottoming and indigo dyeing, and not sulfur topping. Another implementation includes indigo dyeing and sulfur topping, and not sulfur bottoming.

It should be understood that the invention is not limited to the specific flows and steps presented. A flow of the invention may have additional steps (not necessarily described in this patent), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

Figure 4:
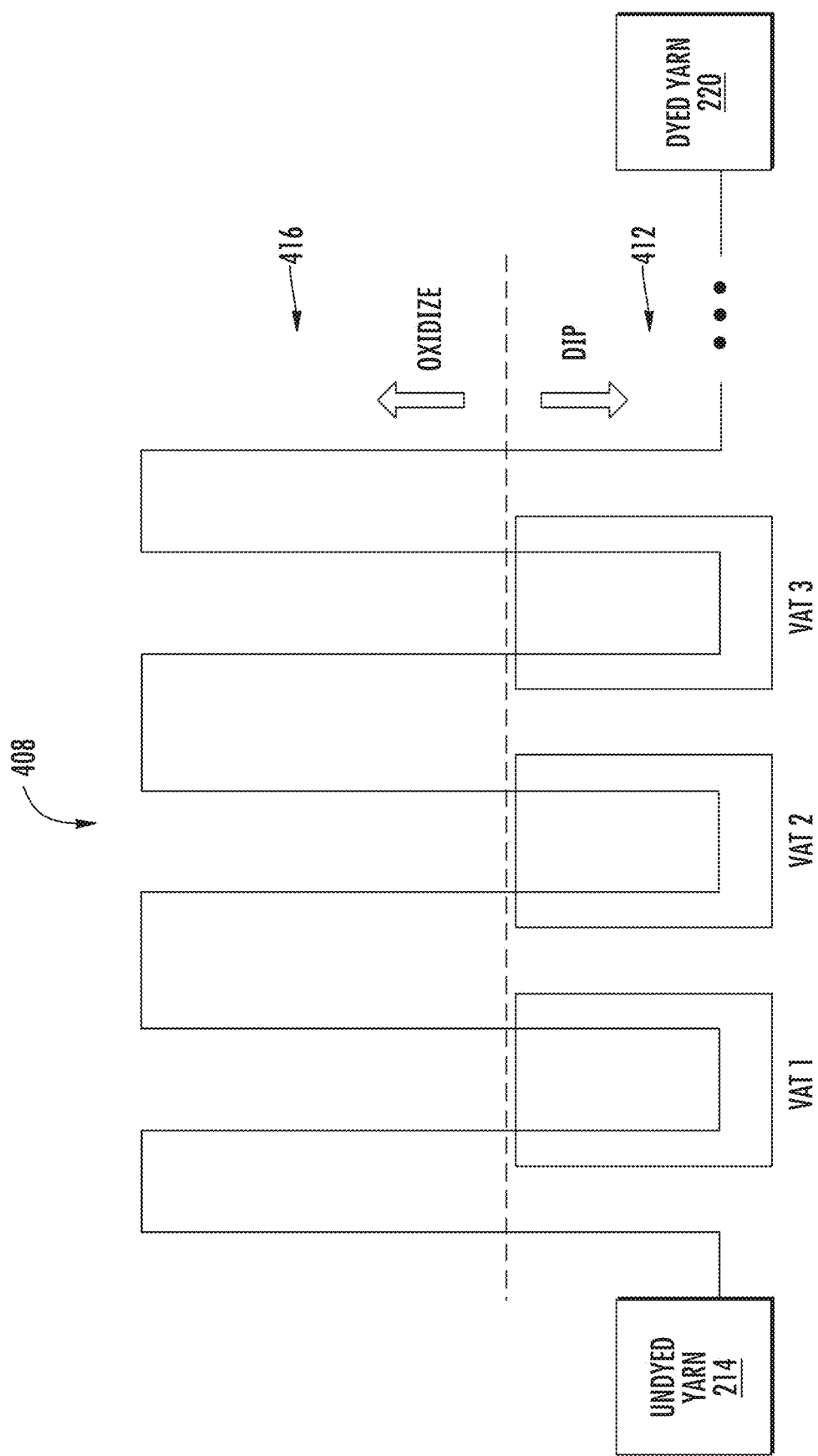
FIG. 4 shows technique of using a dye range to dye yarn.

FIG. 4 shows technique of using an indigo dye range 408 to dye yarn. A dye range machine has that a number of boxes or vats, which are used to hold the solutions that the yarn will be dipped. Dye ranges can have any number of boxes, such as 6 boxes, 8 boxes, or 12 boxes, or greater. With greater number of boxes, more dips are possible.

The boxes or vats 412 for the dye range are typically housed on one floor (e.g., first floor or basement) a building. The dye range has a skyer mechanism 416 with extends through the ceiling of the floor with boxes into upper floors of the building, such as the second and third floors, or higher floors. For example, for a three floor unit, where each floor is about 12 feet, the skyer unit can extend into the air at least 24 feet.

During operation, undyed yarn 214 is conducted or transported via rollers, pulleys, and other mechanisms and pathways through the various boxes (e.g., vat 1, vat 2, and vat 3) to dip the yarn into the solutions within the boxes. The solutions in the boxes can be for sulfur bottoming (optional), indigo dip in a reduced indigo solution, and sulfur topping (optional). Between dips, the yarn is conducted via the skyer above the boxes or vats (or urns or vessels), which exposes the yarn to oxygen so it can oxidize and the indigo can turn blue. At the end of the process, dyed yarn 220 is obtained.

Figure 5:
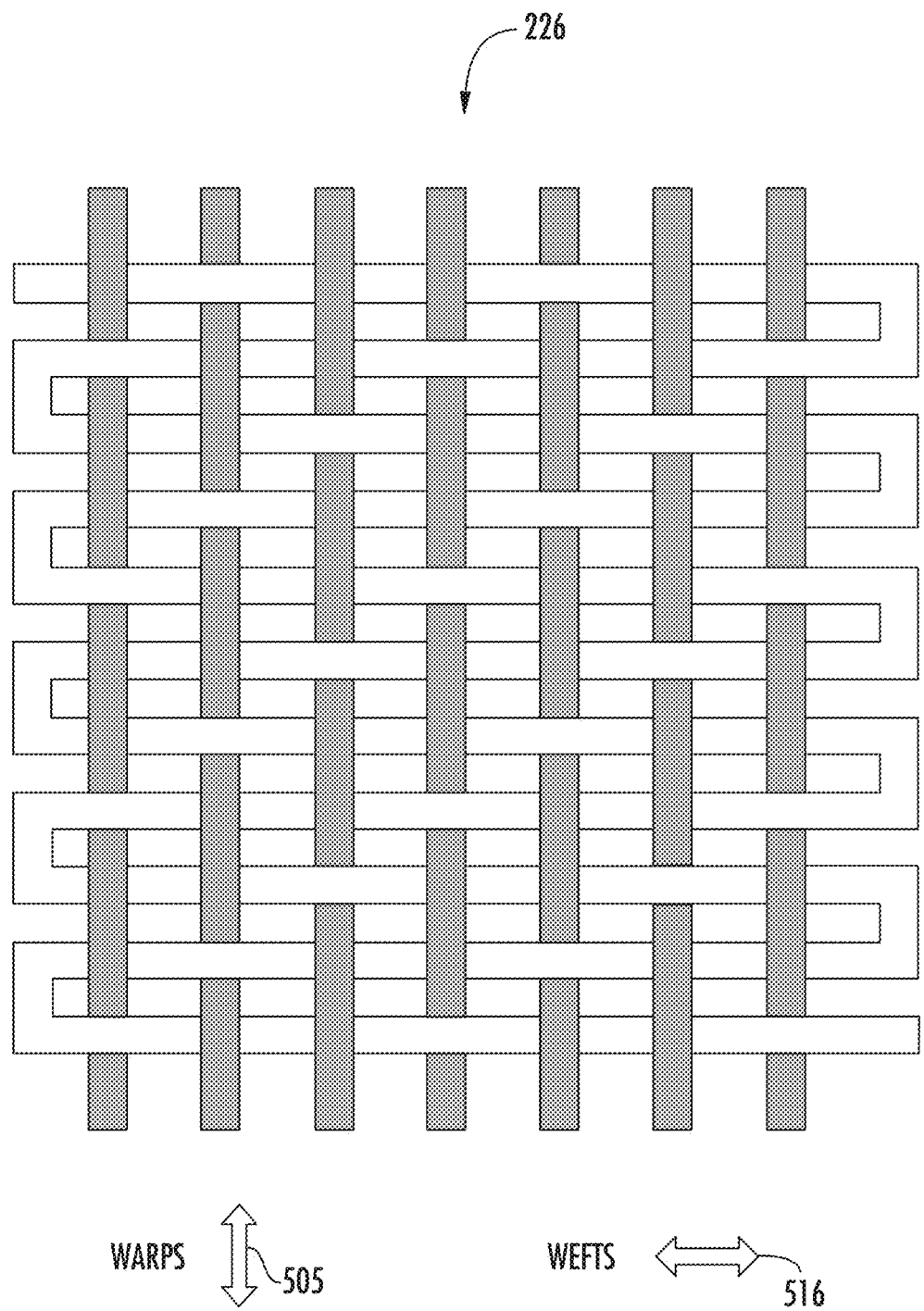
FIG. 5 shows a weave pattern for a denim fabric.

FIG. 5 shows a weave pattern of a denim fabric 220. A loom does the weaving. In weaving, warp is the lengthwise or longitudinal yarn or thread in a roll, while weft or woof is the transverse thread. The weft yarn is drawn through the warp yarns to create the fabric. In FIG. 5, the warps extend in a first direction 505 (e.g., north an south) while the wefts extend in a direction 516 (e.g., east and west). The wefts are shown as a continuous yarn that zigzags across the wefts (e.g., carried across by a shuttle or a rapier of the loom). Alternatively, the wefts could be separate yarns. In some specific implementations, the warp yarn has a different weight or thickness than the weft yarns. For example, warp yarns can be coarser than the weft yarns.

For denim, dyed yarn 220 is used for the warp, and undyed or white yarn is typically used for the weft yarn. In some denim fabrics, the weft yarn can be dyed and have a color other than white, such as red. In the denim weave, the weft passes under two or more warp threads. FIG. 5 shows a weave with the weft passing under two warp threads. Specifically, the fabric weave is known as a 2×1 right-hand twill. For a right-hand twill, a direction of the diagonal is from a lower left to an upper right. For a left-hand twill, a direction of the diagonal is from an lower right to an upper left. But in other denim weaves, the weft can pass under a different number of warp threads, such as 3, 4, 5, 6, 7, 8, or more. In other implementation, the denim is a 3×1 right-hand twill, which means the weft passes under three warp threads.

Because of the weave, one side of the fabric exposes more of the warp yarns (e.g., warp-faced side), while the other side exposes more of the weft yarns (e.g., weft-faced side). When the warp yarns are blue and weft yarns are white, a result of the weave is the warp-faced side will appear mostly blue while the reverse side, weft-faced side, will appear mostly white.

In denim, the warp is typically 100 percent cotton. But some warp yarns can be a blend with, for example, elastane to allow for warp stretch. And some yarns for other fabrics may contain other fibers, such as polyester or elastane as examples.

Figure 6:
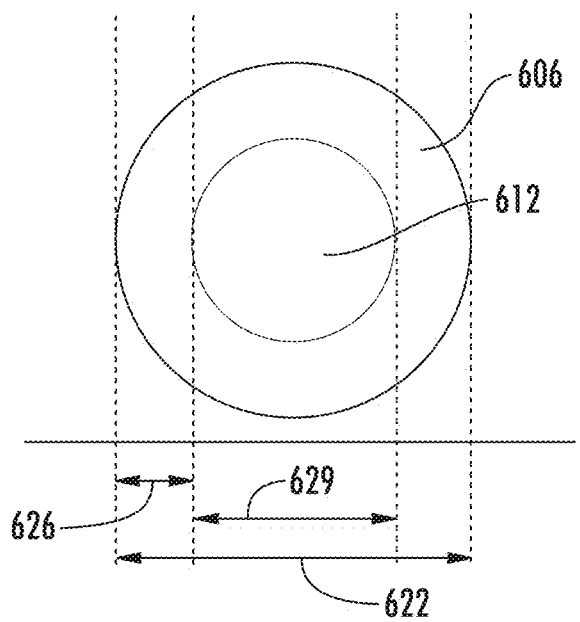
FIG. 6 shows a cross section of a dyed yarn with a ring dyeing effect.

FIG. 6 shows a cross section of a dyed yarn with a ring dyeing effect. A ring dyeing effect occurs when dyeing of a yarn does not diffuse or penetrate completely through the yarn. Rather, a surface layer 606 of the yarn is dyed, while a core 612 of the yarn is not. The core would remain undyed and, for example, white. In denim, the warp yarns are indigo dyed, and a cross section of ring-dyed warp yarns would be similar to that shown in FIG. 6.

The yarn has a diameter 622, the ring dyed portion has a thickness 626, and the core has a diameter 629. An area of the yarn, A(yarn), is Pi*(D622/2)^2, where Pi a mathematical constant, the ratio of a circle's circumference to its diameter, approximated as 3.14159, D622 is diameter 622, and ^2 indicates the quantity in parenthesis to the power 2 or squared. An area of the core, A(core), is Pi*(D612/2)^2, where D612 is diameter 612. The area of the ring dyed portion is A(yarn) minus A(core).

To simplify the diagram, FIG. 6 shows a solid or hard boundary between the dyed portion and the undyed core portion. In practice, the boundary between the dyed and undyed portions can be due to dye diffusion, a gradient, where the dye gradually lightens or fades in blue color.

Ring dyeing is often considered undesirable since the dye is not evenly been distributed through the yarn. However, for laser finishing, ring-dyed yarn can improve a fabric's response characteristics to the laser. Fabric with ring-dyed yarn has an improved grayscale resolution, allowing the laser to obtain a greater number of gray levels that are visually distinguishable from each other.

Figure 7:
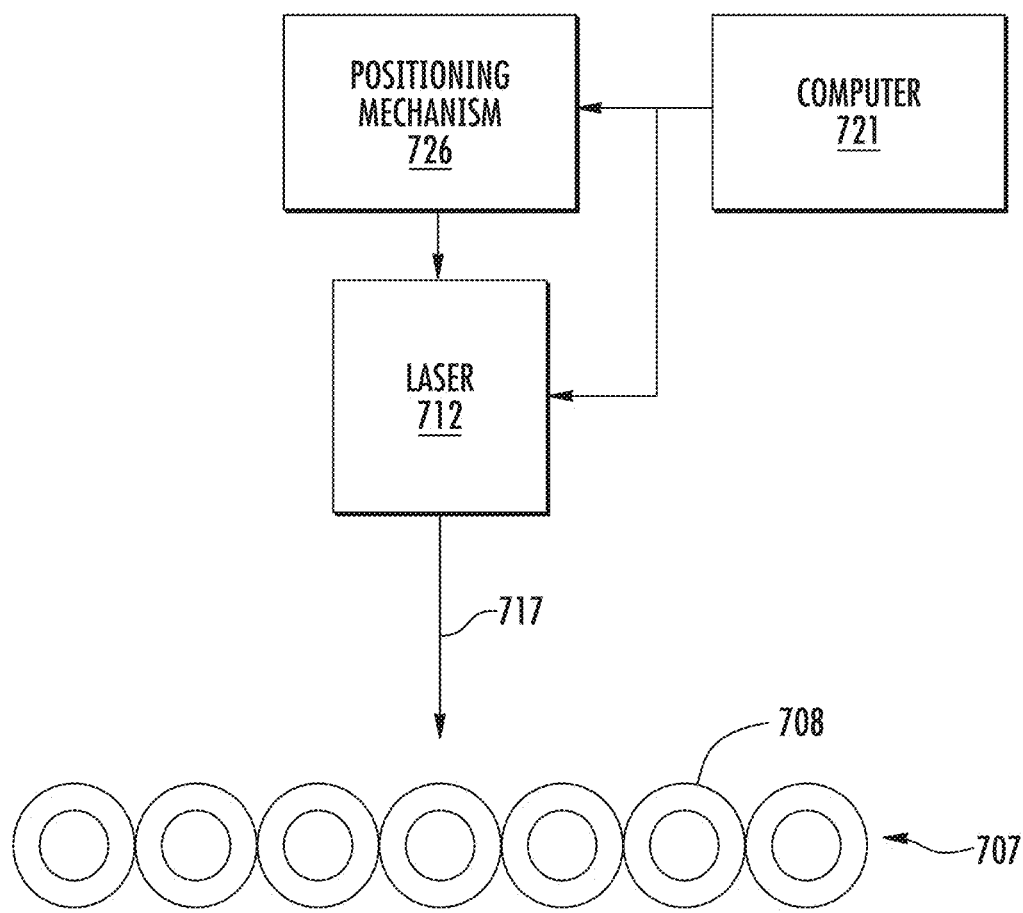
FIG. 7 shows a technique of laser finishing denim fabric made from ring-dyed yarn.

FIG. 7 shows a technique of laser finishing denim fabric 703 with ring-dyed yarn 708. In denim, the ring-dyed yarn is the warp yarn. The fabric or garment is positioned in front of a laser 712 that emits a laser beam 717 that strikes the fabric. A computer 721 controls a power level and exposure time of the laser. The resulting laser beam removes at least a portion of the dyed yarn with chromophores from the fabric. Depending on the amount of dyed yarn with chromophores removed, the shade of blue of the fabric can be altered or varied, from deep blue to white.

The computer can control a positioning mechanism 726 to position the laser to print, for example, a distressing pattern or any other pattern onto the garment. For example, the laser can print the pattern row by row (or column by column). Also, the laser can make multiple passes across one or more rows (or columns). Multiple passes can be used to further increase or enhance grayscale resolution. Also laser passes may be made between rows (e.g., half or quarter rows), which can increase pixel resolution.

Laser finishing is a technique that includes the use of a laser. A laser is a device that emits light through a process of optical amplification based on the stimulated emission of electromagnetic radiation. Lasers are used for bar code scanning, medical procedures such as corrective eye surgery, and industrial applications such as welding. A particular type of laser for finishing apparel is a carbon dioxide laser, which emits a beam of infrared radiation.

The laser can be controlled by an input file and control software to emit a laser beam onto fabric at a particular position or location at a specific power level for a specific amount of time. Further, the power of the laser beam can be varied according to a waveform such as a pulse wave with a particular frequency, period, pulse width, or other characteristic. Some aspects of the laser that can be controlled include the duty cycle, frequency, marking or burning speed, and other parameters.

The duty cycle is a percentage of laser emission time. Some examples of duty cycle percentages include 40, 45, 50, 55, 60, 80, and 100 percent. The frequency is the laser pulse frequency. A low frequency might be, for example, 5 kilohertz, while a high frequency might be, for example, 25 kilohertz. Generally, lower frequencies will have higher surface penetration than high frequencies, which has less surface penetration.

The laser acts like a printer and "prints," "marks," or "burns" a wear pattern (specified by, for example, an input file) onto the garment. The fabric that is exposed to the infrared beam changes color, lightening the fabric at a specified position by a certain amount based on the laser power, time of exposure, and waveform used. The laser continues from position to position until the wear pattern is completely printed on the garment.

In a specific implementation, the laser has a resolution of about 34 dots per inch (dpi), which on the garment is about 0.7 millimeters per pixel. The technique described in this patent is not dependent on the laser's resolution, and will work with lasers that have more or less resolution than 34 dots per inch. For example, the laser can have a resolution of 10, 15, 20, 25, 30, 40, 50, 60, 72, 80, 96, 100, 120, 150, 200, 300, or 600 dots per inch, or more or less than any of these or other values. Typically, the greater the resolution, the finer the features that can be printed on the garment in a single pass. By using multiple passes (e.g., 2, 3, 4, 5, or more passes) with the laser, the effective resolution can be increased. In an implementation, multiple laser passes are used.

Figure 8:
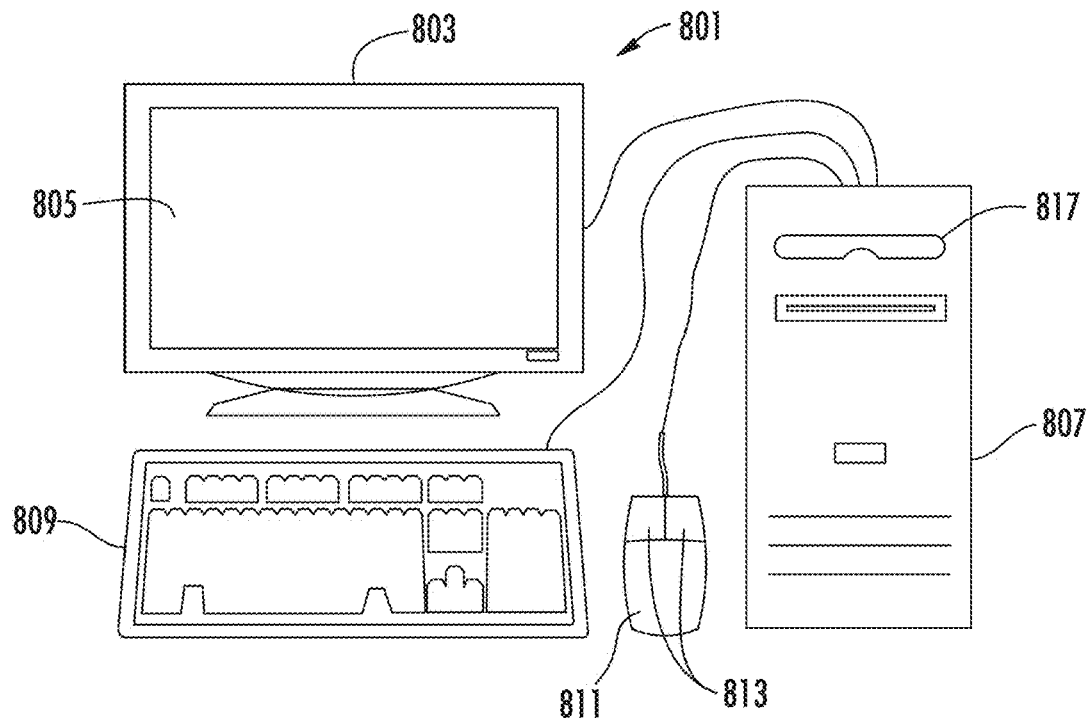
FIG. 8 shows a computer system which is part of a laser finishing system for apparel or system for manufacturing a fabric with enhanced response characteristics for laser finishing.

A system of laser finishing can include a computer to control or monitor operation, or both. FIG. 8 shows an example of a computer that is component of a laser finishing system. The computer may be a separate unit that is connected to a laser system, or may be embedded in electronics of the laser system. In an embodiment, the invention includes software that executes on a computer workstation system, such as shown in FIG. 8.

Further, a system for manufacturing a fabric with enhanced response characteristics for laser finishing can also include a computer to control or monitor operation, or both. FIG. 8 also shows an example of a computer that is component of a fabric manufacturing system. For example, the computer can be connected to control the spinning machines, dye range or dyeing machines, loom or weaving machines, or other machines used in the manufacture or processing of the fabric, or a combination of these.

FIG. 8 shows a computer system 801 that includes a monitor 803, screen 805, enclosure 807, keyboard 809, and mouse 811. Mouse 811 may have one or more buttons such as mouse buttons 813. Enclosure 807 (may also be referred to as a system unit, cabinet, or case) houses familiar computer components, some of which are not shown, such as a processor, memory, mass storage devices 817, and the like.

Mass storage devices 817 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 817. The source code of the software of the present invention may also be stored or reside on mass storage device 817 (e.g., hard disk, magnetic disk, tape, or CD-ROM). As a further example, code of the invention may be transmitted via wires, radio waves, or through a network such as the Internet.

Figure 9:
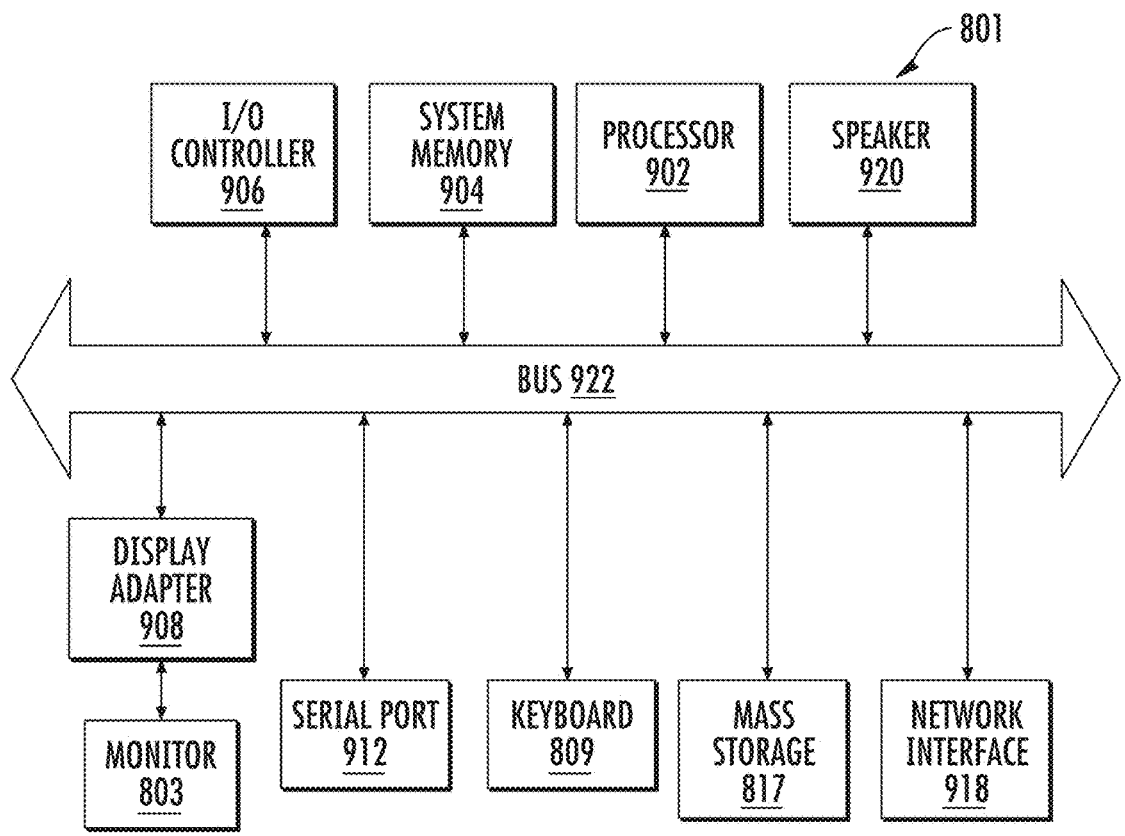
FIG. 9 shows a system block diagram of the computer system.

FIG. 9 shows a system block diagram of computer system 801 used to execute software of the present invention. As in FIG. 8, computer system 801 includes monitor 803, keyboard 809, and mass storage devices 817. Computer system 801 further includes subsystems such as central processor 902, system memory 904, input/output (I/O) controller 906, display adapter 908, serial or universal serial bus (USB) port 912, network interface 918, and speaker 920. The invention may also be used with computer systems with additional or fewer subsystems. For example, a computer system could include more than one processor 902 (i.e., a multiprocessor system) or the system may include a cache memory.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network.

Arrows such as 922 represent the system bus architecture of computer system 801. However, these arrows are illustrative of any interconnection scheme serving to link the subsystems. For example, speaker 920 could be connected to the other subsystems through a port or have an internal connection to central processor 902. Computer system 801 shown in FIG. 8 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab, SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation. Other operating systems may be used. A computer in a distributed computing environment may use a different operating system from other computers.

Any trademarks or service marks used in this patent are property of their respective owner. Any company, product, or service names in this patent are for identification purposes only. Use of these names, logos, and brands does not imply endorsement.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1×RDD, and EV-DO). For example, signals from a computer may be transferred, at least in part, wirelessly to components or other computers.

FIGS. 10-13 show how the laser alters the color of ring-dyed yarn. FIG. 10 shows a laser beam 1007 striking a ring-dyed yarn 1013 having indigo-dyed fibers 1018 and white core fibers 1022. The laser removes the dyed fibers, which can be by vaporizing or otherwise destroying the cotton fiber via heat or high temperature that the laser beam causes.

FIG. 11 shows the laser using a first power level setting or first exposure time setting, or a combination of these, to remove some of the dyed fibers, but not revealing any of the white core fibers. The undyed fibers remain covered. There is no color change.

FIG. 12 shows the laser using a second power level setting or second exposure time setting, or a combination of these, to remove more of the dyed fibers than in FIG. 11. The second power level is greater than the first power level, or the second exposure time setting is greater than the first exposure time setting, or a combination of these. The result is some of the undyed fibers are revealed. There is a color change, subtle highlighting.

FIG. 13 shows the laser using a third power level setting or third exposure time setting, or a combination of these, to remove even more of the dyed fibers than in FIG. 12. The third power level is greater than the second power level, or the third exposure time setting is greater than the second exposure time setting, or a combination of these. The result is more of the undyed fibers are revealed. There is a color change, brighter highlighting.

Further, the diameter of lasers beam can be adjusted or changed. The focal distance between the lens and the fabric may also be adjusted to keep the laser focused. In a specific laser finishing system, the laser is set to allow it to reach a size of an entire pair of pants from top (e.g., waistband) to bottom (e.g., leg opening ends); at that focal distance, the resolution for the laser is 1 millimeter. The resolution can be increased, but then the laser will need to be moved closer to the fabric, and the laser would not reach a typical pair of pants, top to bottom.

The laser system has a scan speed, which is also known as a pixel time or exposure time setting. This is the amount of time the laser spends at each pixel. As an example, a black pixel (which prints as "white" on the denim) of "0" is 100 percent of the pixel time, and each fading grey is a percentage of that pixel time. So a very light file (e.g., less highlighting) will move more quickly across a garment than a more intense one. When using an enhanced laser-sensitive fabric, less time and energy is needed to create the pattern. In an implementation, when the laser power level or intensity is fixed, the exposure time is used to determine the energy a pixel of the apparel is exposed to.

In another implementation, the exposure time is fixed, and the laser power level or intensity is adjustable or variable to determine the energy at a pixel of the apparel is exposed to. In another implementation, the laser power level and exposure time are both variable to determine the energy at a pixel of the apparel is exposed to.

FIGS. 14-16 show the impact of the thickness or depth of the ring dye on the laser's ability alter the color of the ring-dyed yarn. FIG. 14 shows a first thickness or depth of the ring dye. FIG. 15 shows a second thickness or depth of the ring dye. FIG. 16 shows a third thickness or depth of the ring dye. The first thickness is thicker than the second thickness, and the second thickness is greater than the first thickness.

FIG. 14 shows that due to the first thickness being relatively thick, the laser does not remove sufficient amount of the dyed region to expose the core fibers. There is no color change, and the result is no highlighting.

FIG. 15 shows that due to the second thickness being a medium thickness, the laser removes some of the dyed region so that some of the white core fibers are exposed. The result is slight highlighting.

FIG. 16 shows that due to the third thickness being a relatively narrow thickness, the laser removes the dyed region so that many of the white core fibers are exposed. The result is very bright highlighting.

Figure 17:
FIGS. 17-18 show photomicrographs of cross sections of warp yarn, before and after lasering.

FIG. 17 shows a photomicrograph of a cross section of warp yarn from a denim fabric, before lasering. The warp yarns exhibit ring dying.

Figure 18:
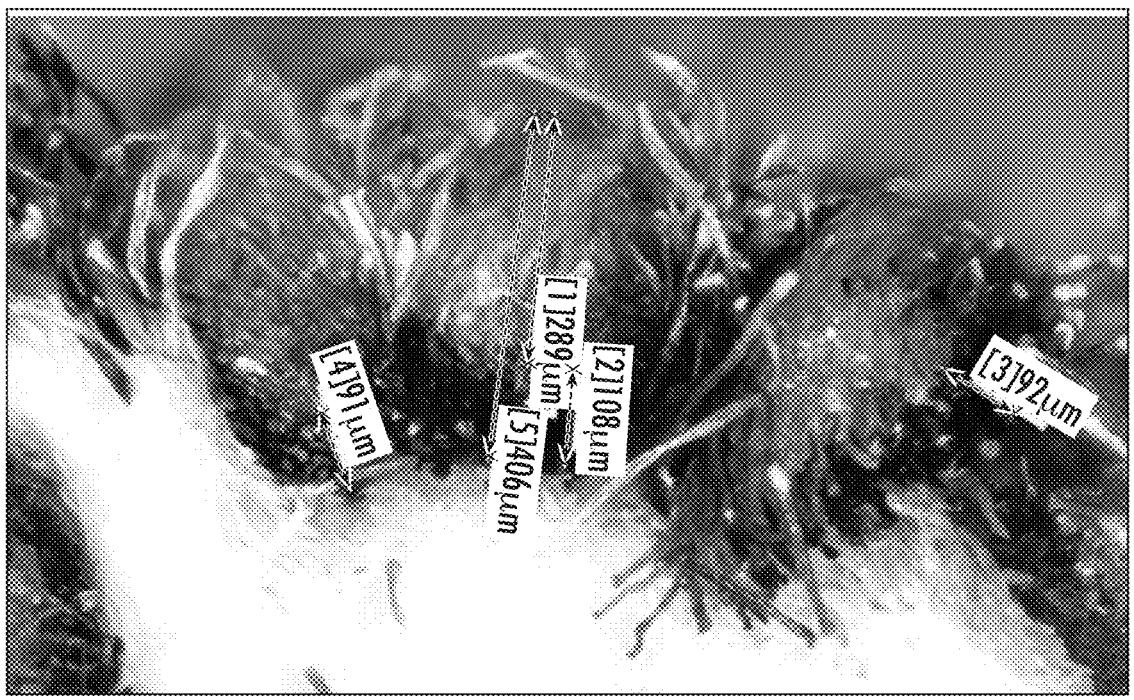

FIG. 18 shows a photomicrograph of a cross section of warp yarn from a denim fabric, after lasering. Some of the ring dyed portion has been removed by the laser, and the white fibers of the core are exposed. The dyed portion (e.g., indigo- or blue-colored portion) can be referred to as an outer ring, while the undyed or less dyed portion (e.g., white or off-white colored portion) can be referred to as an inner core.

If FIG. 18, some of the measured ring dye thicknesses are 91, 108, and 92 microns. A measure distance of yarn surface to exposed fiber length is about 406 microns. A measured distance from yarn surface to exposed fiber length is about 406 microns. A measured distance from core edge to exposed fiber length is about 289 microns.

In a specific implementation of ring dyed yarn, the ring dye thickness or depth penetrates no more than about 10 percent of the yarn thickness, from all surfaces (or sides). So, about 20 percent of the total diameter is dyed, and the core is 80 percent of the diameter.

Further, due to process variations, the total ring dye thickness (including both sides) can vary, such as 20 percent plus or minus 10, 15, 20, 25, or even up to 50 percent in some instances. So, the ranges can be from about 18 to 22 percent, about 17 to 23 percent, about 16 to 24 percent, about 15 to 25 percent, or up to about 10 to 30 percent. The ring dye thickness for a single side would about half of these values. More specifically, the range for a single-side ring dye thickness would be about 9 to 11 percent, about 8.5 to 11.5 percent, about 8 to 12 percent, about 7.5 to 12.5 percent, or up to about 5 to 15 percent.

As an example, in an implementation, for greater highlights from laser finishing, the total ring-depth depth (which includes thicknesses of both sides of the outer ring) should be from about 15 percent to about 25 percent of the yarn thickness or diameter. When less than 15 percent, the ring dye can wash down too fast, and there not enough colored material for the laser to work with. With more than 25 percent ring-dye is not responsive to provide as large a number of grayscale levels (e.g., not able to provide 64 or more different levels, 128 or more different levels, or 256 or more different levels). Therefore, for a single side, the outer ring thickness can be from about 7.5 percent (e.g., 15 percent divided by 2) to about 12.5 percent (e.g., 25 percent divided by 2).

As a result of the process of making a fabric, a fabric has response characteristics for laser finishing. It is desirable that the fabric have the following good or strong performance characteristics including: (i) fast or relatively fast color change with minimal laser irradiation, (ii) color changes to a hue close to white (e.g., 64 or more grayscale levels, 128 grayscale levels, or 256 or more grayscale levels), and (iii) minimal degradation to strength or stretch properties, or any combination of these. It is undesirable that the fabric have the following poor performance characteristics such as: (i) slow color change, (ii) color changes to a color with noticeable hue, such as grey, blue, or green, instead of white or (iii) unacceptable degradation to strength or stretch properties, or any combination of these.

A fabric with good characteristics for laser finishing has yarns with undyed core fibers (white fibers) closer to their surfaces. A process is to manufacture yarns and this fabric can include one or more of the following techniques, in any combination:

1. Lower pH. Lowering the pH reduces indigo dye affinity to the yarn fiber, reducing penetration. In a specific implementation, the pH of the indigo dye solutions used in the dyeing process are about 11.6 or less, 11.5 or less, 11.4 or less, 11.3 or less, 11.2 or less, or 11.1 or less. In an implementation, the pH will be in a range from about 10.7 to 11.2. By maintaining pH at these levels, the dye yarn will exhibit the ring dye effect.

2. Premercerization. Swelling of fibers makes indigo dye penetration more difficult, reducing ring-dye depth. When the yarns have been premercerization, the pH can be increased slightly and the yarn will still have a desired ring dye. For example, with premercerization, the pH of the indigo dye solution can be increased to 11.2, rather than using 10.7 or 10.8.

3. Lower dye concentration, faster dying speed, number of dips, lower temperatures, or any combination of these. If shade matching is not important, a technique reduces opportunity for dye penetration. For example, the dye concentration can be in a range from, for example, about 1.0 to 1.05 grams per liter. In other implementations, the range can extend up to 3 grams per liter.

For dips, there can be, for example, about 8 dye dips. In other implementations, there can be 8 or fewer dye dips, such as 2, 3, 4, 5, 6, or 7. In other implementations, there can be more than 8 dye dips, such as 9, 10, 11, 12, or more than 12 dye dips. With more dips, a lower dye concentration (or adjustment in other parameter) can be used to obtain the same shading and core diameter. With fewer dips, a higher dye concentration (or adjustment in other parameter) can be used to obtain the same shading and core diameter.

Alternatively, or in combination with lower dye concentration, there can be faster speed indigo dips in the indigo, or reduce time of yarn in indigo dips. The machine speed of the dye range can be, for example, about 25 meters per minute. The machine speed of the dye range can exceed 25 meters per minute, which will decrease the dye dip time. In other implementations, the machine speed can be less than 25 meters per minute, and other parameters such as the dye concentration can be used to obtain the same shading and core diameter.

Lower temperatures reduce diffusion rate, and thus the ring dye effect will be enhanced and more controllable at lower temperatures. The vats or dye boxes typically have a temperature controller to control heating of the indigo solution. A temperature of the indigo solution is typically room temperature (e.g., 20 degrees Celsius) or above. In an implementation, the temperature range of the indigo solution is from about 20 degrees Celsius to about 30 degrees Celsius. For example, the temperature can be 30 degrees Celsius or below. In an implementation, the temperature range of the indigo solution is from about 30 degrees Celsius to about 40 degrees Celsius. For example, the temperature can be 40 degrees Celsius or below. In an implementation, the temperature range of the indigo solution is from about 40 degrees Celsius to about 50 degrees Celsius. For example, the temperature can be 50 degrees Celsius or below. In an implementation, the temperature range of the indigo solution is from about 50 degrees Celsius to about 60 degrees Celsius. For example, the temperature can be 60 degrees Celsius or below. In an implementation, the temperature range of the indigo solution is from about 60 degrees Celsius to about 70 degrees Celsius. For example, the temperature can be 70 degrees Celsius or below. Various other parameters, such as dye concentration or number of dips, can be adjusted to compensate for higher or lower temperatures.

4. Higher yarn twist. High yarn twist makes dye penetration more difficult, reducing ring-dye depth. For example, yarns for denim are twisted in a range between 4.2 and 4.8 twists per inch or TPI. TPI refers to the number of twist spirals in an inch of yarn. Generally, anything 4.6 or above would be considered a higher twist yarn. For some shrink-to-fit products, yarn twist can be about 4.8 twists per inch.

5. Coarse yarn count. Ring-dye depth is a lower percentage of the total yarn diameter, leaving a large undyed yarn core. More fibers remain for improved tear or tensile properties. For equivalent bath concentrations and warp ends, ratio of dye to fiber mass in bath is lower. Fine yarns are at risk of becoming dyed to the center, leaving no undyed fibers to provide color change and highlight.

For fine yarns, dye penetration makes up a larger percentage of total yarn diameter, leaving only a small white core, meaning the ratio of blue to white fibers is higher. This causes the highlight to appear bluish rather than white. Fine yarns are also more at risk for physical failure before highlight is achieved due to removal of a larger percentage of total fiber.

Figure 19:
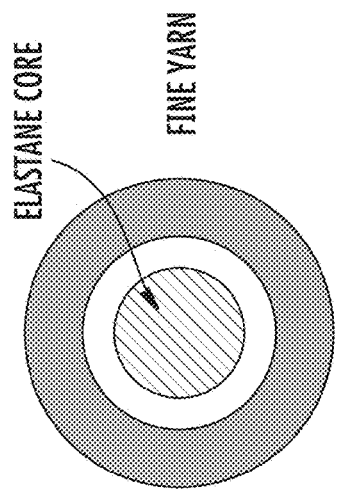
FIGS. 19 and 20 show for the same ring dye thickness or depth, percentages of exposed white fibers for a fine yarn and a coarse yarn, respectively.
Figure 20:
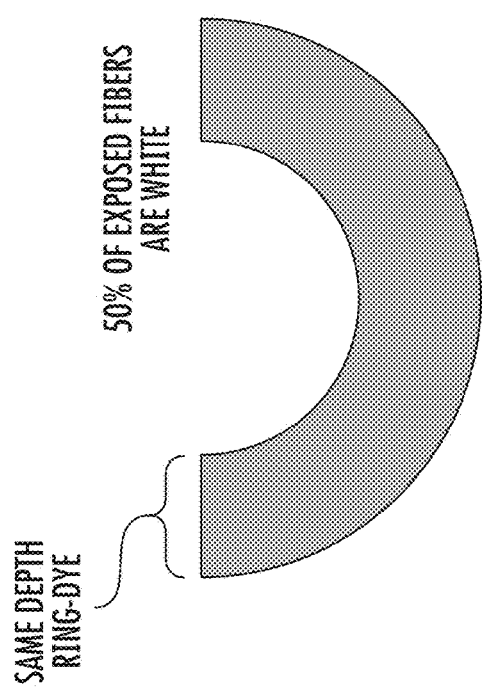

FIGS. 19 and 20 show for the same ring dye thickness or depth, percentages of exposed white fibers for a fine yarn and a coarse yarn, respectively. In FIG. 19, the fine yarn has, as an example, 28 percent of exposed white fibers. In FIG. 20, the coarse yarn has, as an example, 50 percent of exposed white fibers.

6. Reduce, minimize, or eliminate sulfur bottoming. Due to the affinity of sulfur dyestuff to cotton, sulfur dyes penetrate to the yarn core, dyeing the once-white core fibers. The fabric will now highlight to the color of the sulfur bottom. A small amount of sulfur may be acceptable if the core fibers are dyed to a negligible color change. If sulfur bottoming is desired, a dark indigo dye can create the illusion of bright highlights via contrast against base shade.

7. Sulfur topping. Sulfur topping is less risky than bottoming because many dye-sites are already occupied by indigo, and loose indigo slows penetration of sulfur into yarn. However, sulfur topping still contributes to the total dye quantity; high concentrations can still lead to poor performance, particularly with fine yarns.

8. Reduce or minimize elastane fibers in warp. Some warp-stretch fabrics may show poor performance because the elastane core is clear rather than white. This would mean the "target" for a white highlight is doughnut shaped yarn core, which is a more difficult target to hit, particularly in finer yarn counts. Stronger performing warp-stretch fabrics should have both a shallow ring-dye and a large yarn diameter.

Figure 21:
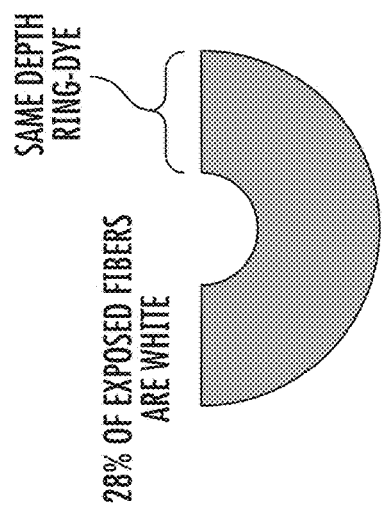
FIGS. 21 and 22 show cross sections of a coarse yarn and a fine yarn, respectively, with elastane cores.
Figure 22:
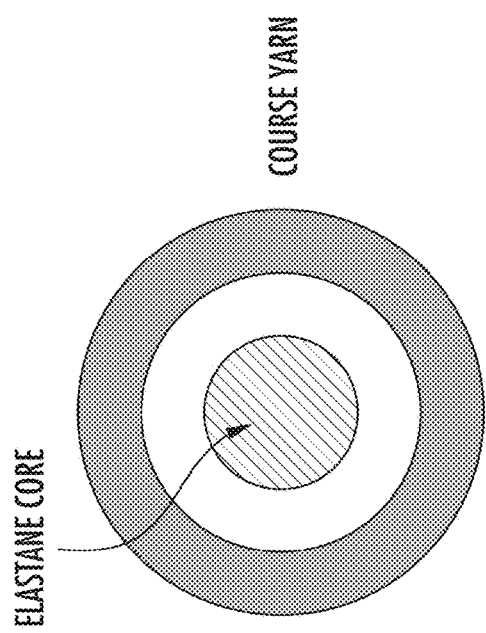

Some warp-stretch failures may pertain to the translucent nature of the elastane core. Since the elastane core is translucent rather than opaque white, indigo dyed fibers are visible through the yarn core. FIGS. 21 and 22 show cross sections of a coarse yarn and a fine yarn, respectively, with elastane cores.

In an implementation, a fabric with excellent performance characteristic has (i) no overdyes, no coatings, (ii) pure indigo dyed at the lowest possible pH (indigo solution has pH of 11.2 or less), and (iii) premercerized warp yarns.

Some other important factors, having secondary impact, include: (i) coarse warp yarns (e.g., 7 s-8 s Ne rather than 13 s-14 s Ne), (ii) high twist warp yarns (above 4.6 twists), (iii) dyed at highest speed allowable to achieve desired shade (can vary between suppliers based on machinery), (iv) no sulfur bottoming or topping, and (v) 100 percent cotton warp.

Typically for denim, yarn counts range from a 7 s Ne to a 16 s Ne, though it is not uncommon to see counts as coarse as a 5 s or as fine as a 20 s. "Ne" represents an English cotton yarn count system (used by the textile industry for cotton spun yarns). It is an indirect way of indicating the coarseness of the yarn, where the lower the number, the coarser the yarn, lower number is a coarser yarn.

The English cotton yarn count system is calculated as follows: "Ne" refers to the number of hanks in pounds. One hank is equal to 840 yards of yarn. For example, 7 s Ne (or a 7 s count) is equal to 7 times 840 yards of yarn in 1 pound. And, 16 s Ne (or a 16 s count) is equal to 16 times 840 yards of yarn in 1 pound.

Some denim yarns have slub, which means a yarn has been engineered with thick and thin places to create a particular aesthetic. The diameter of the yarn is not uniform and can vary across its length. Slub patterns average about 0.25 mile in length of repeat and vary from mill to mill. Thus, the Ne calculation gives the average fineness or thickness of a yarn. Generally, a yarn is described by its yarn count, spinning method, and twist multiple. As an example, men's denim fabric generally use coarser counts like 7 s and 8 s, and women's denim fabrics generally use finer counts of 10 s, 12 s, and 14 s. For stretch products, some finer counts are used.

Although this patent specifically describes laser finishing of woven fabrics, the techniques would also apply to knit fabrics used for knit apparel. A knit fabric is made by a series of interlocking loops of yarn. For laser finishing of knits, the techniques described to produce or obtain a ring-dyed yarn apply. Ring-dyed yarn is used to produce the knit. The knit which is made from ring-dyed can be laser finished.

In an implementation, a method includes processing a cotton yarn using an indigo dye to have a cross section having an outer ring and an inner core, where a thickness of the outer ring is about, for example, from about 7.5 percent to about 12.5 percent of a total thickness of the yarn, and the outer ring is indigo colored due to being penetrated through by the indigo dye while the inner core is white or off-white colored due to not being penetrated to by the indigo dye; and weaving the dyed cotton yarn into a denim fabric, where the warp yarns include dyed cotton and the weft yarns include undyed cotton, and the denim fabric is to be finished by exposing the dyed cotton yarn to a laser.

When exposed to the laser, the laser creates a finishing pattern on a surface of the garment based on a laser input file provided to the laser. The laser input file includes a laser exposure values for different laser pixel location. For each laser exposure value, the laser removes a depth or thickness of material from the surface of the denim material that corresponds to the laser exposure value.

For lighter pixel locations of the finishing pattern, a greater depth of the indigo ring-dyed cotton yarn is removed, revealing a greater width of an inner core of the dyed yarn, as compared to darker pixel locations of the finishing pattern, where a lesser depth of the indigo ring-dyed cotton yarn is removed, revealing a lesser width of an inner core of the dyed yarn.

The laser file includes grayscale values for each pixel location to be lasered. For example, a value can be from 0 to 255 (e.g., an 8-bit binary value) for up to 256 levels of gray. In an implementation, the lower the value, the greater the thickness of the material that will be removed. For a value 255, no material may be removed, while for 0, a maximum amount of material is removed to achieve a very white color, which would represent a well worn point (or pixel) in the finishing pattern. The 0 value may represent a removal of, for example, 50 percent (or more or less) of the thickness of the yarn.

In other implementations, reverse or negative logic may be use, where the greater the value, the less the thickness of the material that will be removed. For example, the greater the value, the greater the thickness of the material that will be removed. For a value 0, no material may be removed, while for 255, a maximum amount of material is removed to achieve a very white color, which would represent a well worn point (or pixel) in the finishing pattern. The 255 value may represent a removal of 50 percent (or more or less) of the thickness of the yarn.

In various implementations, the processing a cotton yarn can include immersing the cotton yarn into at least one indigo dye solution having a pH in a range from about 10.7 to about 11.6. The processing a cotton yarn can include immersing the cotton yarn into at least one indigo dye solution having a pH of about 11.6 or less.

The processing a cotton yarn can include immersing the cotton yarn into at least one indigo dye solution having a pH in a range from about 10.7 to about 11.2, and maintaining a temperature of the indigo dye solution at about 50 degrees Celsius or less (e.g., or 60 degrees Celsius or less or 70 degrees Celsius) while the cotton yarn is being immersed.

The processing a cotton yarn can include mercerizing an undyed cotton yarn in an alkaline solution before an initial immersion of the undyed yarn into an indigo dye solution. This may be referred to as premercerizing the yarn.

The processing a cotton yarn can include not immersing the cotton yarn into a solution including sulfur dyestuff before an initial immersion of the cotton yarn into an indigo dye solution. This may be referred to as not using sulfur bottoming during the processing.

The laser finishing can produce at least 64 different grayscale levels (e.g., at least 128 or at least 256) on the denim fabric. These would be optically distinguishable (e.g., optically distinguishable by a camera, photospectrometer, or the like) grayscale levels on the denim fabric. This allows the finish pattern to show better highlights or a greater distinction between the highs and lows in the pattern. This facilitates garment laser patterning with better aesthetics instead of a duller, less attractive finish.

Further, based on a value stored in laser input file, the laser removes a selected depth of material starting from the outer surface of the yarn. And as a result, a vertical segment of the inner core is revealed by the laser between outer core segments (e.g., left and right outer ring thickness) that is in a range from 0 to about 85 percent of the total thickness of the yarn. This produces at least 64 different grayscale levels (e.g., at least 128 or at least 256) on the denim material.

The cotton yarn can have from about 4.2 to about 4.8 twists per inch. The processing a cotton yarn can include: mercerizing an undyed cotton yarn in an alkaline solution before an initial immersion of the undyed yarn into an indigo dye solution, and immersing the mercerized cotton yarn into five or fewer separate dips of indigo dye solution having a pH of about 11.6 or less.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
processing a cotton yarn using an indigo dye to have a cross section comprising an outer ring and an inner core, wherein a cross section of a ring-dyed yarn comprises a total ring dye thickness of the outer ring that is from 15 percent to 25 percent of a total thickness of the yarn, and the outer ring is indigo colored due to being penetrated through by the indigo dye while the inner core is white or off-white colored due to not being penetrated to by the indigo dye;
weaving the dyed cotton yarn into a denim fabric, wherein the warp yarns comprise dyed cotton and the weft yarns comprise undyed cotton, and the denim fabric is to be finished by exposing the dyed cotton yarn to a laser,
before lasering, a cross section of a warp yarn comprises a generally round shape with dyed indigo fibers in an outer ring that surround a core region comprising white fibers,
when exposed to the laser, the laser creates a finishing pattern on a surface of the garment based on a laser input file provided to the laser, and the laser input file comprises a plurality of laser exposure values, each for a different laser pixel location,
for each laser exposure value, the laser removes a depth of material from the surface of the denim material that corresponds to the laser exposure value,
after being exposed to the laser and the depth of material that has been removed, a cross section of the warp yarn comprises a region with a flattened shape relative to the generally round shape before lasering, and
for lighter pixel locations of the finishing pattern, a greater depth of the indigo ring-dyed cotton yarn is removed, revealing a greater width of an inner core of the dyed yarn, as compared to darker pixel locations of the finishing pattern, where a lesser depth of the indigo ring-dyed cotton yarn is removed, revealing a lesser width of an inner core of the dyed yarn;
using the cotton yarn to create a garment template, wherein the garment template is an assembled garment;
using a digital design tool, creating a laser file including a first finishing pattern, wherein the digital design tool generates a visualization in color on a computer screen of the finishing pattern on the garment template after a postlaser wash and allows editing of the finishing pattern, and
the editing allowed comprises at least one of altering the finishing pattern itself, altering a position of the finishing pattern relative to the garment on the computer screen, or altering a scaling of the finishing pattern relative to the garment on the computer screen; and
inputting the laser file to a laser machine to burn the first finishing pattern onto the garment template.

2. The method of claim 1 wherein the processing a cotton yarn comprises:
immersing the cotton yarn into at least one indigo dye solution having a pH in a range from about 10.7 to about 11.6.

3. The method of claim 1 wherein the processing a cotton yarn comprises:
immersing the cotton yarn into at least one indigo dye solution having a pH of about 11.6 or less.

4. The method of claim 1 wherein the processing a cotton yarn comprises:
mercerizing an undyed cotton yarn in an alkaline solution before an initial immersion of the undyed yarn into an indigo dye solution.

5. The method of claim 1 wherein the processing a cotton yarn comprises:
immersing the cotton yarn into at least one indigo dye solution having a pH in a range from about 10.7 to about 11.2; and
maintaining a temperature of the indigo dye solution at from about 40 degrees Celsius to about 50 degrees Celsius or less while the cotton yarn is being immersed.

6. The method of claim 1 wherein the processing a cotton yarn comprises:
immersing the cotton yarn into at least one indigo dye solution having a pH in a range from about 10.7 to about 11.2; and
maintaining a temperature of the indigo dye solution at from about 50 degrees to about 60 degrees Celsius or less while the cotton yarn is being immersed.

7. The method of claim 1 wherein the processing a cotton yarn comprises:
not immersing the cotton yarn into a solution comprising sulfur dyestuff before an initial immersion of the cotton yarn into an indigo dye solution.

8. The method of claim 1 wherein the laser finishing can produce at least 64 different, optically distinguishable grayscale levels on the denim fabric.

9. The method of claim 1 wherein the laser finishing can produce at least 128 different, optically distinguishable grayscale levels on the denim fabric.

10. The method of claim 1 wherein the laser finishing can produce at least 256 different, optically distinguishable grayscale levels on the denim fabric.

11. The method of claim 1 wherein the cotton yarn comprises a single uniform yarn twist value along its length, wherein the single yarn uniform twist value is from about 4.2 to about 4.8 twists per inch.

12. The method of claim 1 wherein the processing a cotton yarn comprises:
mercerizing an undyed cotton yarn in an alkaline solution before an initial immersion of the undyed yarn into an indigo dye solution; and
immersing the mercerized cotton yarn into five or fewer separate dips of indigo dye solution having a pH of about 11.6 or less.

13. The method of claim 1 wherein the processing a cotton yarn comprises:
not mercerizing an undyed cotton yarn in an alkaline solution before an initial immersion of the undyed yarn into an indigo dye solution.

14. The method of claim 1 wherein the processing a cotton yarn comprises:
immersing the cotton yarn into at least one indigo dye solution having a pH in a range from about 10.7 to about 11.6, wherein the cotton yarn is unmercerized and comprises a uniform yarn twist in a range from about 4.2 to about 4.8 twists per inch; and
maintaining a temperature of the indigo dye solution at from about 40 degrees Celsius to about 50 degrees Celsius or less while the cotton yarn is being immersed.

15. The method of claim 1 wherein the processing a cotton yarn comprises:
immersing the cotton yarn into at least one indigo dye solution having a pH of about 11.6 or less, wherein the cotton yarn is unmercerized and comprises a uniform yarn twist in a range from about 4.2 to about 4.8 twists per inch; and
maintaining a temperature of the indigo dye solution at from about 40 degrees Celsius to about 50 degrees Celsius or less while the cotton yarn is being immersed.

16. The method of claim 1 wherein the processing a cotton yarn comprises:
immersing the cotton yarn into at least one indigo dye solution comprising a concentration from about 1.0 to 1.05 grams per liter.

17. The method of claim 1 wherein the cotton yarn comprises a coarseness of from about 7s Ne to about 8s Ne.

18. The method of claim 1 wherein the cotton yarn comprises a coarseness of from about 7s Ne to about 8s Ne and a yarn twist in a range from about 4.2 to about 4.8 per inch.

19. A method comprising:
providing a garment made from fabric panels of a denim material, wherein the fabric panels are sewn together using thread,
the denim material will be finished by using a laser according to a laser input file comprising a digital finishing pattern to remove selected amounts of material from a surface of the denim material at selected locations of the garment,
the denim material comprises an indigo ring-dyed cotton yarn having a cross section comprising an outer ring and an inner core, a cross-sectional profile of the outer ring relative to the inner core is compatible with the laser to obtain at least 64 different, optically distinguishable grayscale levels, and the cross-sectional profile comprises a total ring dye thickness of the outer ring that is from 15 percent to 25 percent of a total thickness of the yarn,
the outer ring is indigo colored due to being penetrated through by an indigo dye while the inner core is white or off-white colored due to not being penetrated to by the indigo dye, and the indigo ring-dyed cotton yarn with laser-compatible cross-sectional profile is obtained by
mercerizing an undyed yarn in an alkaline solution to obtain an mercerized undyed yarn,
immersing the mercerized undyed yarn into at least one indigo dye solution having a pH in a range from about 10.7 to about 11.6;
using a digital design tool, creating the laser input file including the digital finishing pattern, wherein the digital design tool generates a visualization in color on a computer screen of the finishing pattern on the garment and allows editing of the finishing pattern, and
the editing allowed comprises at least one of altering the finishing pattern itself, altering a position of the finishing pattern relative to the garment on the computer screen, or altering a scaling of the finishing pattern relative to the garment on the computer screen; and
exposing the garment to a laser to create a finishing pattern on a surface of the garment based on the laser input file provided to the laser,
wherein the laser input file comprises a plurality of laser exposure values, each for a different laser pixel location, and
for each laser exposure value, causing the laser to remove a depth of material from the surface of the garment that corresponds to the laser exposure value,
whereby for lighter pixel locations of the finishing pattern, a greater depth of the indigo ring-dyed cotton yarn is removed as compared to darker pixel locations of the finishing pattern, where a lesser depth of the indigo ring-dyed cotton yarn is removed.

20. The method of claim 19 wherein based on a value stored in laser input file, the laser removes a selected depth of material starting from the outer surface of the yarn, and as a result, a vertical segment of the inner core is revealed by the laser between outer core segments that is in a range from 0 to about 85 percent of the total thickness of the yarn, thereby producing at least 64 different, optically distinguishable grayscale levels on the denim material.

21. The method of claim 19 wherein the undyed yarn comprises a single yarn twist value along its length, wherein the single yarn twist value is from about 4.2 to about 4.8 twists per inch.

22. The method of claim 19 wherein the indigo ring-dyed cotton yarn with laser-compatible cross-sectional profile is obtained further by
maintaining a temperature of the indigo dye solution at from about 40 degrees Celsius to about 50 degrees Celsius or less while the mercerized undyed yarn is being immersed.

23. The method of claim 19 wherein the indigo ring-dyed cotton yarn with laser-compatible cross-sectional profile is obtained further by
   maintaining a temperature of the indigo dye solution at from about 50 degrees Celsius to about 60 degrees Celsius or less while the mercerized undyed yarn is being immersed.

24. The method of claim 19 wherein the indigo ring-dyed cotton yarn with laser-compatible cross-sectional profile is obtained further by
   maintaining a temperature of the indigo dye solution at from about 60 degrees Celsius to about 70 degrees Celsius or less while the mercerized undyed yarn is being immersed.

25. The method of claim 19 wherein the indigo ring-dyed cotton yarn with laser-compatible cross-sectional profile is obtained further by
   not immersing the mercerized undyed yarn into a solution comprising sulfur dyestuff before an initial immersion of the mercerized undyed yarn into an indigo dye solution.

26. The method of claim 19 wherein sulfur bottoming is not performed on the undyed yarn.

27. The method of claim 19 wherein the indigo ring-dyed cotton yarn with laser-compatible cross-sectional profile is obtained further by
   maintaining a temperature of the indigo dye solution at from about 40 degrees Celsius to about 50 degrees Celsius or less while the mercerized undyed yarn is being immersed, and the undyed yarn comprises a uniform yarn twist in a range from about 4.2 to about 4.8 twists per inch.

* * * * *